United States Patent
Vij et al.

(10) Patent No.: US 8,058,380 B1
(45) Date of Patent: Nov. 15, 2011

(54) POSS ENHANCED COMPOSITIONS

(75) Inventors: Vandana Vij, Palmdale, CA (US); Gregory R. Yandek, California City, CA (US); Joseph M. Mabry, California City, CA (US); Timothy S. Haddad, Lancaster, CA (US)

(73) Assignee: The United States of America as represented by the Secretary of the Air Force, Washington, DC (US)

( * ) Notice: Subject to any disclaimer, the term of this patent is extended or adjusted under 35 U.S.C. 154(b) by 266 days.

(21) Appl. No.: 12/490,895

(22) Filed: Jun. 24, 2009

(51) Int. Cl.
*C08G 77/04* (2006.01)

(52) U.S. Cl. ........................................... 528/34

(58) Field of Classification Search ............... 528/34
See application file for complete search history.

(56) References Cited

U.S. PATENT DOCUMENTS 7,332,822 B2 *  2/2008  Basheer et al. ............ 257/787

\* cited by examiner

*Primary Examiner* — Kuo-Liang Peng
(74) *Attorney, Agent, or Firm* — AFMCLO/JAZ; Daniel Krieger

(57) ABSTRACT

A. new compound, a high temperature POSS-dianiline is provided. It is a composition of nanoparticles, which can be incorporated into polymers such as polyimides, polyamides, cyanate esters, and epoxies, for improved properties and performance of such polymers.

5 Claims, No Drawings

POSS ENHANCED COMPOSITIONS

STATEMENT OF GOVERNMENT INTEREST

The invention described herein may be manufactured and used by or for the Government for governmental purposes without the payment of any royalty thereon.

FIELD OF THE INVENTION

This invention relates to methods for improving the properties of monomers and polymers by the addition of nano-materials, particularly POSS nano-materials and the resulting compositions.

BACKGROUND OF THE INVENTION

The controlled assembly of nanoscopic reinforcing particles in host polymer systems has resulted in improvements in various properties such as thermo-oxidative stability, response to mechanical load, thermal expansion, space survivability, abrasion resistance, and other surface-related properties. The application of nanotechnology has enabled expansion of the end-use envelope of many organic materials. Polyhedral oligomeric silsesquioxanes (POSS) has proven to be a remarkably effective class of additive nanoparticles due to their inherent size, shape, rigidity, and versatility in functionality. The ability to chemically tailor POSS through synthetic control of its organic periphery offers a unique design tool for controlling particle dispersion in host materials.

However, current commercially available POSS compounds, such as POSS-dianilines either contain thermally labile aliphatic groups or excessive amine functionality. For example, octa-aminophenyl POSS is the only purely aromatic version but contains eight reactive groups which can be detrimental to polymer performance due to excessive cross-linking, thereby inhibiting assembly.

Accordingly, there is need and market for a suitable POSS composition which can overcome the above prior art shortcomings.

There has now been developed a new form of POSS dianilines, which can be reactively incorporated into polyimides, polyamides, cyanate esters, and epoxies for enhanced performance thereof as described below.

SUMMARY OF THE INVENTION

Broadly, the present invention provides a method comprising, the synthesis and application of novel high temperature POSS-dianiline monomers, namely heptaphenylbis(aminophenyl)methylsiloxy POSS, which can be reactively incorporated into polyimides and epoxies for enhanced performance.

DEFINITIONS

By nanoparticles, as used herein, is meant those of a size of 1 micron or less, i.e., 1000 nanometers down to 1 nanometer. For example, a POSS cage is considered to be about 1.5 nanometers wide.

By POSS-dianiline monomer(s), as used herein, is meant such monomers having para or meta amino substituents.

DESCRIPTION OF PREFERRED EMBODIMENTS

Referring to the present invention in detail, the inventive POSS-dianiline monomers are made by following synthesis:

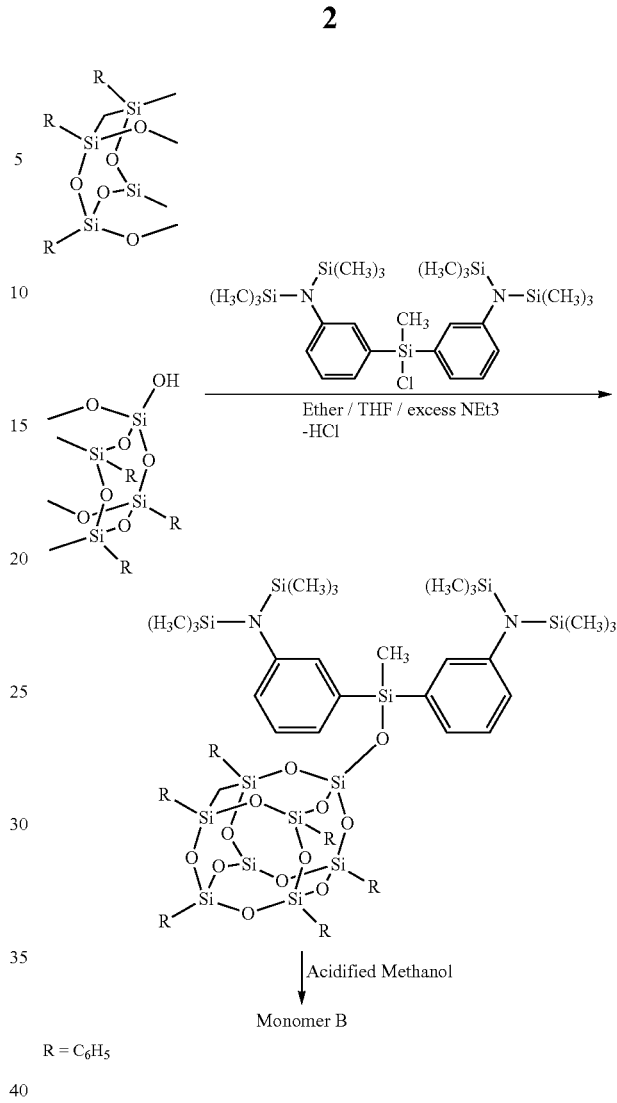

$R = C_6H_5$

The invention further provides the POSS-dianiline MONOMER B as follows:

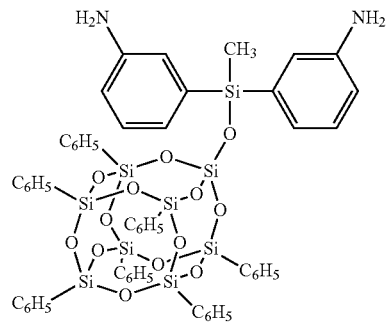

Monomer B

Having Meta Amino Groups

The invention also provides MONOMER A (same as above but having para $NH_2$s) and method therefor, similar to the above method The invention also provides a method for incorporating POSS-dianiline monomer, having para or meta amino substituents into polymeric Kapton® comprising:

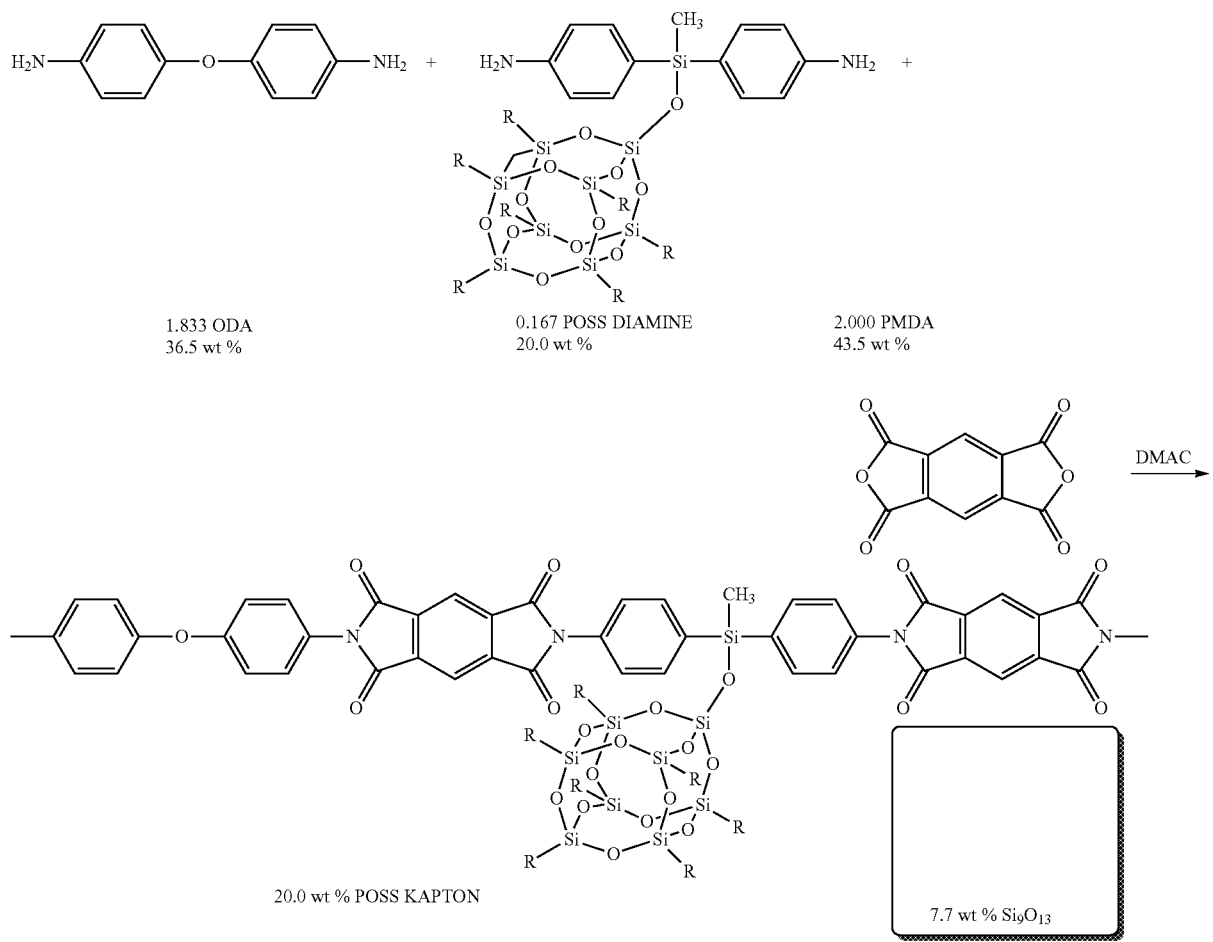

In like manner, the invention further provides a method for reactively incorporating POSS-dianiline monomer into polyimides, polyamides, cyanate esters, and epoxies to enhance the properties of same.

The invention thus describes the synthesis and subsequent application of novel polyhedral oligomeric silsesquioxane dianilines, namely heptaphenylbis(aminophenyl)methylsiloxy POSS, through a relatively cost-effective manufacturing method, where the amine groups can be placed in the meta or para positions. The uniqueness of the disclosed material in comparison with existing versions of POSS is its design for incorporation into those polymers designated as "high temperature" that can withstand continuous service at 200-350 degrees C. in an oxygen-rich environment. From the viewpoint of chemical architecture, heptaphenylbis(aminophenyl) methylsiloxy POSS features a T8 silsesquioxane cage surrounded by seven aromatic groups and a dianiline moeity that equips the molecule for facile attachment to host systems that accept amines through chemical reaction, such as polyimides through linear copolymerization and epoxies where the dianiline can act as a crosslinking agent. High aromaticity and a lack of thermally labile groups enables unprecedented thermal stability for a POSS-dianiline and good solubility in high temperature polymers.

The following examples are intended to illustrate the present invention and should not be construed in limitation thereof.

Example 1

Monomer Synthesis

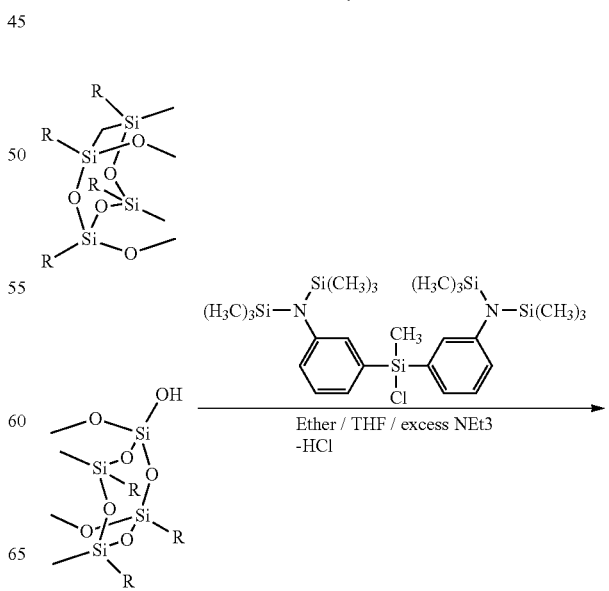

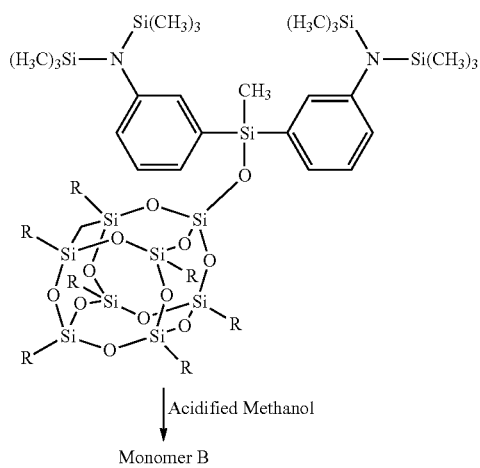

Monomer B

R = C$_6$H$_5$

In a typical preparation, the synthesis of the monomer precursor involves formation of di(N,N-bis(trimethylsilyl) aminophenylchloromethylsilane using 3'-[Bis(trimethylsilyl)amino]-phenylmagnesium chloride and stoichiometric amount of trichloromethylsilane.

1M solution of 3'-[Bis(trimethylsilyl) amino]-phenylmagnesium chloride (30 mL 0.0300 mol) in 25 mL of anhydrous THF was taken in an addition funnel and slowly added to a stirring mixture of trichioroinethylsilane in 15 mL anhydrous THF (2.252 gm, 0.015 mol) and stirred overnight. The solvent was pumped off from the reaction mixture and dry hexane added to extract the product by filteration. The light yellow colored filtrate was transferred to a distillation flask and all volatiles were removed under a dynamic vacuum. The residual viscous liquid was distilled using a Kugelrohr apparatus to give di(N,N-bis(trimethylsilyl)-aminophenylchloromethylsilane (amino groups at meta position), as a colorless, viscous liquid in 90% yield. $^1$H NMR (CDCl$_3$) d 0.08 ppm (36H, NSi CH3), 0.93 ppm (s, 3H, SiCH3), 6.94-7.36 ppm (8H). $^{29}$Si NMR (CDCl$_3$) d 4.83 ppm, 9.89 ppm Synthesis of Phenyl POSS-silanol: A solution of distilled silicon tetrachloride (1.915 g, 0.0113 mol) in anhydrous THF was added slowly to a stirring solution of 10 g (0.0107 mol) of commercially available Phenyl triol in 50 mL anhydrous THF. This was followed by addition of 3.585 g (0.0354 mol) in 5 mL anhydrous THF over a period of ½h. The reaction mixture was stirred overnight followed by filtration. The filter cake was washed with distilled H$_2$O, THF and finally with chloroform. The organic layer was separated and stirred with 20 mL distilled water and 2 ml 0.1M dilute hydrochloric acid for 1 h. The organic layer was washed with H$_2$O, dilute HCl and brine solution followed by rotavaping to slurry and crashed in 150 mL tech. methanol. After two hours of stirring, the mixture was filtered and the filter cake dried to give 9.19 g (92%) of pure Phenyl POSS-silanol. $^{29}$Si NMR (CDCl$_3$) d −77.93, −78.21, −78.27, −100.386

Incorporation into POSS Cages: A solution of 0.67 g (1.216 mmol) of di(N,N-bis(trimethylsilyl)aminophenyl-chloromethylsilane in 2 mL, dry ether was added very slowly to a stirring solution of 1.08 g (1.1 mmol) POSS-silanol in 5 mL dry ether and 2 mL anhydrous THF. To this was very slowly added a solution of 0.116 g (1.15 mmol) of distilled triethylamine in dry ether. This was left stirring over night. The solution was filtered to remove NEt$_3$.HCl precipitates and rotavaped to slurry. The slurry was crashed in 150 mL reagent brand methanol acidified with glacial acetic acid to give POSS dianiline monomer in 98% yield. $^{29}$Si NMR (CDC13) d −8.185, −77.95, −77.77, −109.251, Example 2

Procedure for Incorporation into Kapton® (a polyimide noted below): Heptaphenylbis(aminophenyl)methylsiloxy POSS is subsequently referred to as POSS-diamine monomer.

Pyromellitic dianhydride (PMDA) was obtained from Aldrich and recrystallized in dioxane before use. Oxydianiline (ODA) was obtained from Lancaster synthesis and recrystallized in DMF/Toluene before use. 99.9% Dimethyl acetamide was obtained from Aldrich and distilled under reduced pressure over Bad (barium oxide) before use.

Various proportions of POSS-diamine monomer and 4, 4'-oxydianilne (ODA) were reacted with pyromellitic dianhydride (PMDA) to form PMDA-(ODA/POSS-diamine) copoly (amic acid)

The copoly(amic acid) of 5 wt. % POSS/PMDA-ODA (1.9% cage) was prepared by first putting 0.083 mmol(0.1 g) of POSS-diamine in 4 mL DMAC into a stirring solution of 4.50 mmol (0.901 g) of ODA in 4 mL DMAC in inert atmosphere. Then, after POSS-diamine and ODA had dissolved completely, 4.585 mmol (1 g) of PMDA in 4 mL DMAC was slowly added to the stirring mixture of POSS-diamine and ODA. The solution was stirred continuously overnight and a viscous PAA solution was obtained. 10 wt. % (3.8% cage), 15 wt. % (5.7% cage) and 20 wt. % (7.7% cage) copoly (amic acid) were obtained similarly by changing the various loadings.

|  | 5% POSS | 10% POSS | 15% POSS | 20% POSS |
| --- | --- | --- | --- | --- |
| POSS | 0.1 g | 0.209 g | 0.328 g | 0.460 g |
| ODA | 0.901 g | 0.883 g | 0.863 g | 0.841 g |
| PMDA | 1 g | 1 g | 1 g | 1 g |

PMDA-ODA/POSS-diamine mixtures were cast on glass slides and subsequently put in vacuum oven at 80° C. for 4 hours and under a nitrogen purge. Imidization of POSS-PMDA-ODA was carried out by putting the samples in a nitrogen circulated vacuum oven at 120, 160, 200, 250 for 1 h each and then at 280° C. for 2 h to ensure complete imidization.

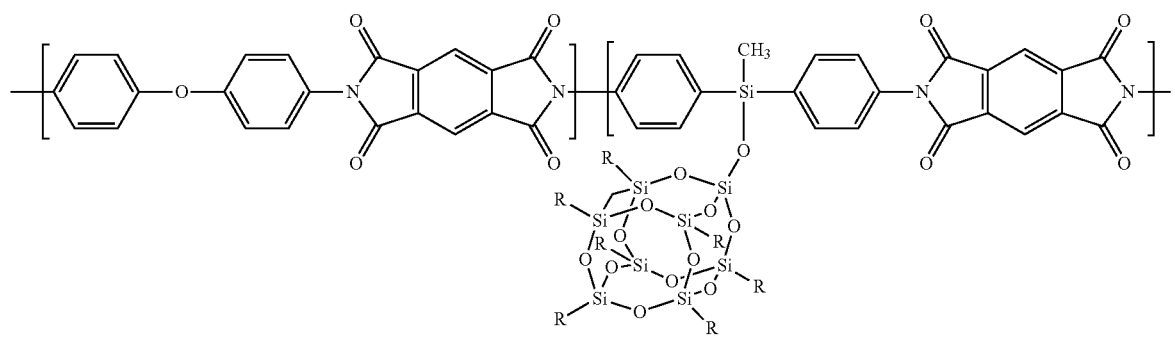
R = C₆H₅
20 Wt % (4.2 Mole %) POSS KAPTON
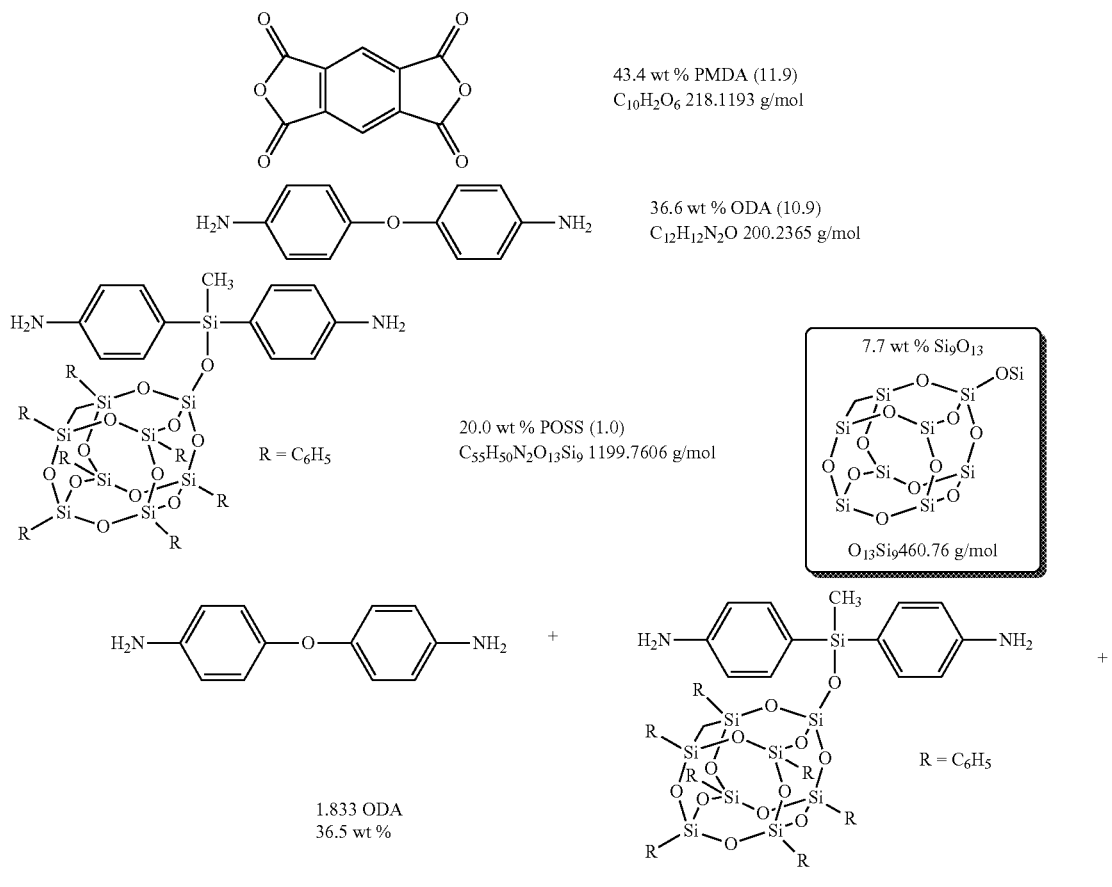
43.4 wt % PMDA (11.9)
$C_{10}H_2O_6$ 218.1193 g/mol
36.6 wt % ODA (10.9)
$C_{12}H_{12}N_2O$ 200.2365 g/mol
7.7 wt % $Si_9O_{13}$
$O_{13}Si_9$ 460.76 g/mol
20.0 wt % POSS (1.0)
$C_{55}H_{50}N_2O_{13}Si_9$ 1199.7606 g/mol
1.833 ODA
36.5 wt %
R = C₆H₅
0.167 POSS DIAMINE
20.0 wt %
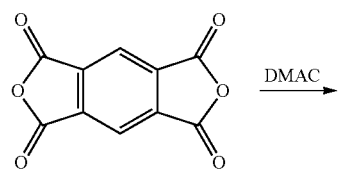
2.000 PMDA
43.5 wt %

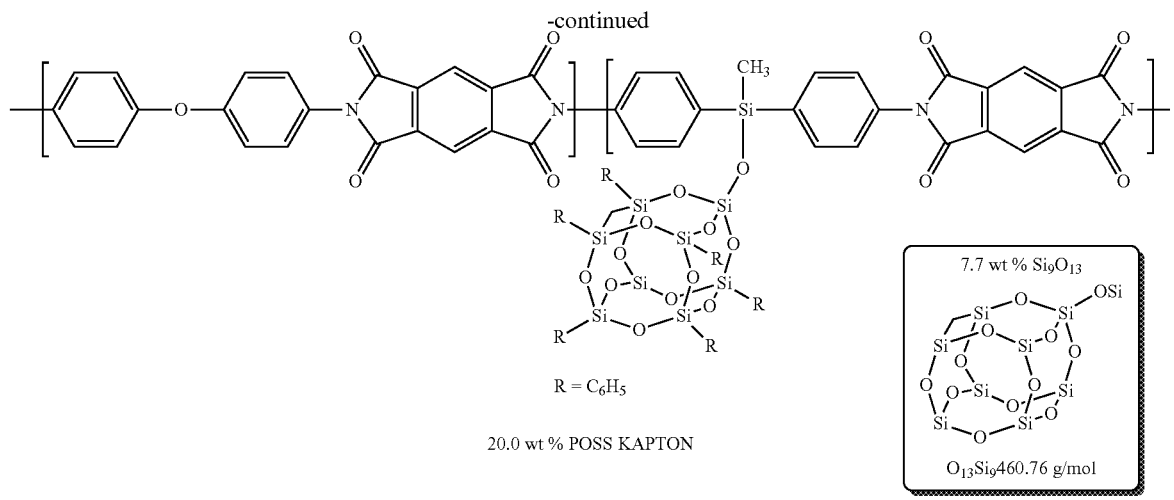

20.0 wt % POSS KAPTON 7.7 wt % Si$_9$O$_{13}$

O$_{13}$Si$_9$ 460.76 g/mol

In like manner, the POSS-dianiline can be reactively incorporated into other polyimides, polyamides, cyanate esters, and epoxies for enhanced performance, as noted above.

The advantages and utilities of the present invention are as follows:

Heptaphenylbis(aminophenyl)methylsiloxy POSS features high aromaticity and unprecedented thermal stability for a POSS dianiline. The chemical architecture of the disclosed material enables POSS cage assembly during incorporation into a host polymer for optimal performance boosts and the high peripheral aromaticity of the POSS cage enables for an "inter-locking" effect between cages if aggregation occurs. This in turn reduces local polymer chain motion around regions of high POSS concentration under conditions characterized by mechanical load and/or thermal stress.

The POSS-dianiline monomer of the invention can serve as a reinforcing agent for high performance thermoplastic or thermosetting polyimides, polyamides, cyanate esters, and epoxies which can be used as structural materials or coatings for spacecraft, aircraft, rocket motors and engines, ships, and weapons as well as automotive structures and all domestic applications requiring materials with dimensional stability, especially in situations with applied loads at elevated temperatures.

The POSS-dianiline monomer of the invention can be used in applications for enhanced performance of polyimides, polyamides, cyanate esters, or epoxies particularly where there are applied loads at elevated temperatures. Incorporation of such monomers into these polymers can improve the space surviveability, thermo-oxidative stability, moisture resistance, mechanical properties and surface characteristics of such polymers, e.g., as used in structural and coating applications. Copolymerized materials derived from the present invention can be used on aircraft, spacecraft, ships, automobiles and weapons.

What is claimed is:

1. A POSS-dianiline monomer of the formula

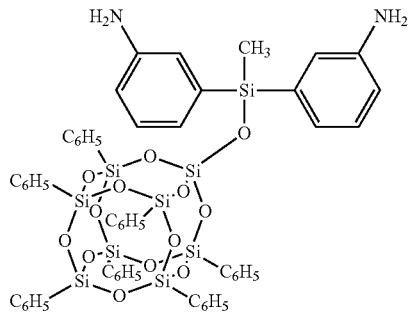

having meta amino groups.

2. A composition comprising a polyimide, a polyamide, a cyanate ester or an epoxy; and the POSS-dianiline monomer of claim 1.

3. A wire insulation comprising a wire and an insulation thereon, wherein the insulation comprises the POSS-dianiline monomer of claim 1.

4. A continuous fiber-reinforced thermosetting or thermoplastic polymer matrix composite (PMC) for structural applications, wherein said PMC comprises the POSS-dianiline monomer of claim 1.

5. A POSS-dianiline monomer of the formula

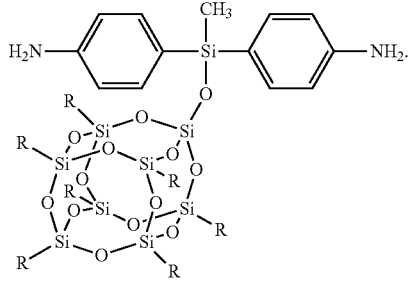

wherein R is C$_6$H$_5$.

* * * * *